(12) United States Patent
Ito et al.

(10) Patent No.: US 7,756,408 B2
(45) Date of Patent: Jul. 13, 2010

(54) FOCUS CONTROL AMOUNT DETERMINATION APPARATUS, METHOD, AND IMAGING APPARATUS

(75) Inventors: Wataru Ito, Kanagawa-ken (JP); Yuanzhong Li, Tokyo (JP)

(73) Assignee: FUJIFILM Corporation (JP)

( * ) Notice: Subject to any disclaimer, the term of this patent is extended or adjusted under 35 U.S.C. 154(b) by 803 days.

(21) Appl. No.: 11/712,388

(22) Filed: Mar. 1, 2007

(65) Prior Publication Data
US 2007/0206939 A1    Sep. 6, 2007

(30) Foreign Application Priority Data
Mar. 3, 2006    (JP)    .............. 2006/057757

(51) Int. Cl.
G03B 13/36    (2006.01)
(52) U.S. Cl. .................. 396/123; 396/125
(58) Field of Classification Search .......... 396/123, 396/125
See application file for complete search history.

(56) References Cited
U.S. PATENT DOCUMENTS
7,565,073 B2 * 7/2009 Kameyama et al. ......... 396/123

2007/0269196 A1 * 11/2007 Misawa .................. 396/123

FOREIGN PATENT DOCUMENTS
JP    11-146405 A    5/1999
JP    2004-317699 A    11/2004

OTHER PUBLICATIONS
T.F. Cootes et al., In Proc. 5th European Conference on Computer Vision, Springer Germany, vol. 2, pp. 484-498, 1998.

* cited by examiner

*Primary Examiner*—W. B. Perkey
(74) *Attorney, Agent, or Firm*—Studebaker & Brackett PC; Donald R. Studebaker

(57) ABSTRACT

In the AF processing section, the parameter obtaining section obtains a weighting parameter value for a principal component that represents a sharpness level of a face portion of an image, an example of a predetermined structure in an image, detected by the face detection section by applying the detected face portion to a model generated by a predetermined statistical processing, such as AAM or the like, based on a plurality of images that represent the face portion in different sharpness levels, and the control amount determination section determines the focus control amount according to the obtained parameter value.

11 Claims, 11 Drawing Sheets

FOCUS CONTROL AMOUNT DETERMINATION APPARATUS, METHOD, AND IMAGING APPARATUS

BACKGROUND OF THE INVENTION

1. Field of the Invention

The present invention relates to a focus control amount determination apparatus and method for determining a focus control amount for an imaging optical system in an automatic focus mechanism of an imaging apparatus. It also relates to an imaging apparatus that includes the focus control amount determination apparatus.

2. Description of the Related Art

In imaging devices, such as digital still cameras, digital video cameras, and the like, autofocus (AF) mechanisms that causes the focus lens to come into focus on a predetermined subject have been widely use. The AF mechanisms include the active system in which the distance from the imaging apparatus to the subject is measured by irradiating infrared light from the imaging device to the subject, and detecting the angle of the infrared light reflected back to the imaging device, and the position of the focus lens is set where the focus lens comes into focus on the object at the measured distance, and the passive system in which the focused status is detected by processing image signals outputted from the imaging means of an imaging apparatus, and the focus lens is set at a position where best focus status is obtained.

The passive AF mechanisms which are widely known in the art include: the phase detection system in which the focusing status is determined from the amount of lateral displacement, and the contrast detection system in which the focusing status is determined from the contrast of the image. In the contrast detection AF mechanism, the focus lens is moved in a stepwise manner within the working range of focusing (e.g., from near end to infinity), and image data are obtained from the imaging means every time the focus lens is moved stepwise, thereby the focus lens is set at a position corresponding to a maximum focus evaluation value (contrast value) of the obtained image data.

When taking a portrait, it is desirable that the focus is adjusted on the face of the person, the major subject of the image. In a conventional AF control system, in which the AF area, the subject area for distance measurement and focus determination, is fixed in the center of the imaging screen. Therefore, if two persons, the major subjects, present on the screen, each on each side of the center, for example, the focus is adjusted on the background included in the AF area located in the center of the screen, which causes a what is known as "clearing in midsection" and the image obtained is out of focus for the two persons.

Consequently, the following methods for preventing such clearing in midsection phenomena are known in the passive system AF mechanism. In one of the methods, as described, for example, in Japanese Unexamined Patent Publication No. 11 (1999)-146405, a flesh color area indicating a person is detected from the image signals outputted from the imaging means, and the focus lens is set at a position where best focus state is obtained using the detected flesh color area as the AF area. In another method, as described, for example, in Japanese Unexamined Patent Publication No. 2004-317699, a characteristic region is extracted from an image on the imaging screen, then a face is discriminated from the extracted characteristic region, and if the size of the discriminated face is greater than or equal to a predetermined value, contrast evaluation values employed in the contrast detection system are calculated, using the area including the face as the AF area.

In the method described in Japanese Unexamined Patent Publication No. 11 (1999)-146405, however, there may be a case that the focus is adjusted on a flesh color region of an image other than the face, since the flesh color region of the image is fixedly determined as a human area. In the method described in Japanese Unexamined Patent Publication No. 2004-317699, there may be a case that the focus is not adjusted on the face of a person, since the AF area also includes the area other than the face although the face is discriminated, and if the contrast in the region is great, the focus evaluation value becomes maximum in the region and the focus is adjusted thereon.

SUMMARY OF THE INVENTION

The present invention has been developed in view of the circumstances described above, and it is an object of the present invention to provide an apparatus and method, and an imaging apparatus capable of determining a focus control amount for an imaging optical system so as to come into focus on a predetermined structure within a subject, such as a human face or the like, with higher accuracy.

The focus control amount determination method of the present invention is a method including the steps of:

detecting a predetermined structure within a subject from inputted image data obtained through digital conversion of an image of the subject generated on an imaging surface, formed of an image sensor, by focusing light from the subject through an imaging optical system;

obtaining a sharpness parameter that represents a weighting value for a statistical characteristic amount representing a sharpness level of the structure by applying the detected structure to a model, which represents the structure by means of: one or more statistical characteristic amounts, including the statistical characteristic amount representing the sharpness level of the structure, obtained by performing a predetermined statistical processing on image data representing a plurality of images that represent the predetermined structure in different sharpness levels; and a weighting parameter for weighting each of the statistical characteristic amounts according to each of the characteristics of the structure; and determining the focus control amount for the imaging optical system such that the structure within the subject of the image is brought into focus according to the obtained value of the sharpness parameter.

The focus control amount determination apparatus of the present invention is an apparatus for realizing the method described above. That is, the apparatus includes:

a detection means for detecting a predetermined structure within a subject from inputted image data obtained through digital conversion of an image of the subject generated on an imaging surface, formed of an image sensor, by focusing the light from the subject through an imaging optical system;

a parameter obtaining means for obtaining a sharpness parameter that represents a weighting value for a statistical characteristic amount representing a sharpness level of the structure by applying the structure detected by the detection means to a model, which represents the structure by means of: one or more statistical characteristic amounts, including the statistical characteristic amount representing the sharpness level of the structure, obtained by performing a predetermined statistical processing on image data representing a plurality of images that represent the predetermined structure in different sharpness levels; and a weighting parameter for weighting each of the statistical characteristic amounts according to each of the characteristics of the structure; and a control amount determination means for determining the focus control amount for the imaging optical system such that the structure within the subject of the image is brought into focus according to the obtained value of the sharpness parameter.

The imaging apparatus of the present invention is an apparatus that includes therein the focus control amount determination apparatus. That is, it includes:

an imaging optical system;

an image sensor forming an imaging surface on which an image of a subject is focused through the imaging optical system;

a conversion means for performing digital conversion on the image of the subject generated on the imaging surface;

the focus control amount determination apparatus described above; and a means for controlling the focus of the imaging optical system according to the control amount determined by the focus control amount determination apparatus.

Preferably, the "predetermined structure" is a structure appropriate for modeling, i.e., a structure whose variation in the shape or luminance in the image falls within a certain range. In particular, a structure from which a statistical characteristic amount having a higher level of explanatory power for the shape or luminance thereof is derived by performing statistical processing thereon is preferable. One of the specific examples is a human face.

As a specific method for realizing the "model representing a (predetermined) structure", a method that employs AAM (Active Appearance Models) may be used. The AAM is one of the approaches for trying to interpret image contents based on a model. For example, if a face is the interpretation target object, a mathematical model of a face is generated by performing a principal component analysis on the shapes of the face portions of a plurality of learning images, or on the luminance data after normalization of the shapes. Then, the face portion of a new input image is represented by each of the principal components and a weighting parameter for reconstructing the face image. The method is described in a non-patent literature "Active Appearance Models", T. F. Cootes et al., In Proc. 5th European Conference on Computer Vision, Springer, Germany, vol. 2, pp. 484-498, 1998 (reference document 1).

The referent of "sharpness level" as used herein means a degree of sharpness of an image. More specifically, every degree of sharpness from an emphasized contour image to a blurred image may be included.

The "images that represent the predetermined structure in different sharpness levels" may be the images obtained by actually imaging the structure in different sharpness levels, or those generated through simulation based on an image obtained in a specific sharpness level.

As for the "predetermined statistical processing", a dimension compression processing capable of representing the structure by compressing it to a statistical amount with the number of dimensions less than the number of pixels representing the structure is preferable. A specific example may be a multivariate statistical technique, such as the principal component analysis or the like. If the principal component analysis is performed as the "predetermined statistical processing", the "statistical characteristic amounts" means a plurality of principal components obtained by the principal component analysis. The level of the explanatory power described above means that a higher order principal component has a higher level of explanatory power, and a lower order principal component has a lower level of explanatory power, taking the case where the predetermined statistical processing is the principal component analysis as an example.

The "statistical characteristic amounts" need to represent at least information based on the luminance of the predetermined structure, since the sharpness level is represented in an image by the distribution of the luminance.

Further, the "statistical characteristic amount representing the sharpness level of the structure" may be a single or a plurality of statistical characteristic amounts.

The referent of "applying the detected structure to a model representing the structure" as used herein means arithmetic operations or the like for representing the structure in the image by the model. More specifically, it means to obtain a weighting parameter value for each of the principal components in the mathematical model, taking the case where the AAM is used as an example.

An arrangement may be adopted in which a plurality of models of the present invention is provided with respect to each of the attributes of the predetermined structure, then one of the models is selected, and the sharpness parameter is obtained by applying the predetermined structure to the selected model.

The referent of "attribute" as used herein means, for example, the gender, age, or race, if the predetermined structure is a human face. Further, it may be information for identifying an individual. In this case, the model for each attribute means the model for each individual. Still further, an arrangement may be adopted in which GPS information is received, and the race is predicted from the received GPS information, i.e., the region information of the imaged location, such as a country or the like.

The process of "determining the focus control amount of the imaging optical system according to the obtained value of the sharpness parameter so that the subject of the image is brought into focus in the structure" may be a process in which information that indicates the correlation between the values of the sharpness parameter and focus control amounts of the imaging optical system is stored, and the focus control amount corresponding to the value of the sharpness parameter obtained by applying the predetermined structure to the model is obtained based on the stored correlation information. Further, the contrast detection system may be applied, in which the focus position of the imaging optical system is sequentially moved at a predetermined step width; image data of an image obtained by performing imaging at each focus position are obtained and the predetermined structure is detected from the image; the sharpness parameter of the detected structure is obtained by applying the detected structure to the model; and the focus control amount is determined based on the focus position of the imaging optical system corresponding to an optimum value of the sharpness parameter (the value of the sharpness parameter when the sharpness of the predetermined structure is most favorable).

According to the focus control amount determination apparatus and method, and the imaging apparatus of the present invention, a sharpness parameter of a predetermined structure detected from an input image is obtained by applying the detected structure to a model, which represents the structure by means of one or more statistical characteristic amounts, including the statistical characteristic amount representing the sharpness level of the structure, and a weighting parameter for weighting each of the statistical characteristic amounts; and the focus control amount of the imaging optical system according to the obtained value of the sharpness parameter is determined so that the subject of the image is brought into focus in the structure. Therefore, in autofocus control, the influence of sharpness in the area other than the predetermined structure is eliminated, and highly accurate focus state of the structure may be obtained based only on the sharpness of the structure, so that an image representing the structure in more favorable state may be obtained by imaging the structure under the focus of the imaging optical system controlled according to the determined focus control amount.

If the information that indicates the correlation between the values of the sharpness parameter and focus control amounts of the imaging optical system is stored, and the focus control amount corresponding to the value of the sharpness parameter obtained by applying the predetermined structure to the model is obtained based on the stored correlation information. This eliminates the need to obtain an image at each position of the focus lens by sequentially moving the position of the focus lens as in the conventional contrast detection system. Consequently, power consumption and processing time for moving the focus lens may be saved.

Further, if a plurality of models of the present invention is provided with respect to each of the attributes of the predetermined structure, then one of the models is selected, and the sharpness parameter is obtained by applying the predetermined structure to the selected model, the predetermined structure, which is a main subject, may be applied to a more appropriate model, so that the processing accuracy is improved and a higher quality image may be obtained.

DESCRIPTION OF THE PREFERRED EMBODIMENTS

Hereinafter, embodiments of the present invention will be described in detail with reference to the accompanying drawings. In the embodiments, a digital camera that includes the focus control amount determination apparatus will be described as an example. But it will be appreciated that the application scope of the present invention is not limited to this, and the present invention is applicable to other electronic devices having electronic imaging functions, such as digital video cameras, cell phones with digital cameras, PDAs with digital cameras, and the like.

Figure 1:
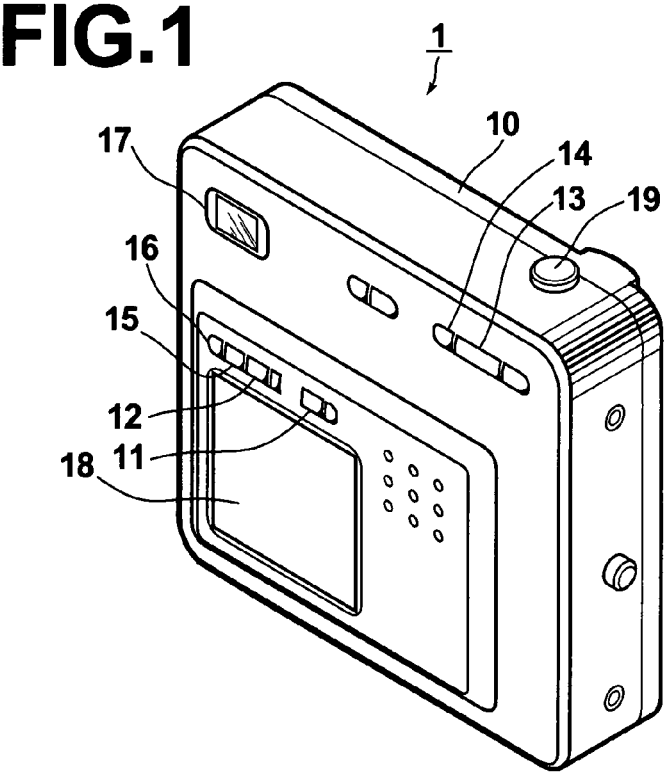
FIG. 1 is a rear view of a digital camera.
Figure 2:
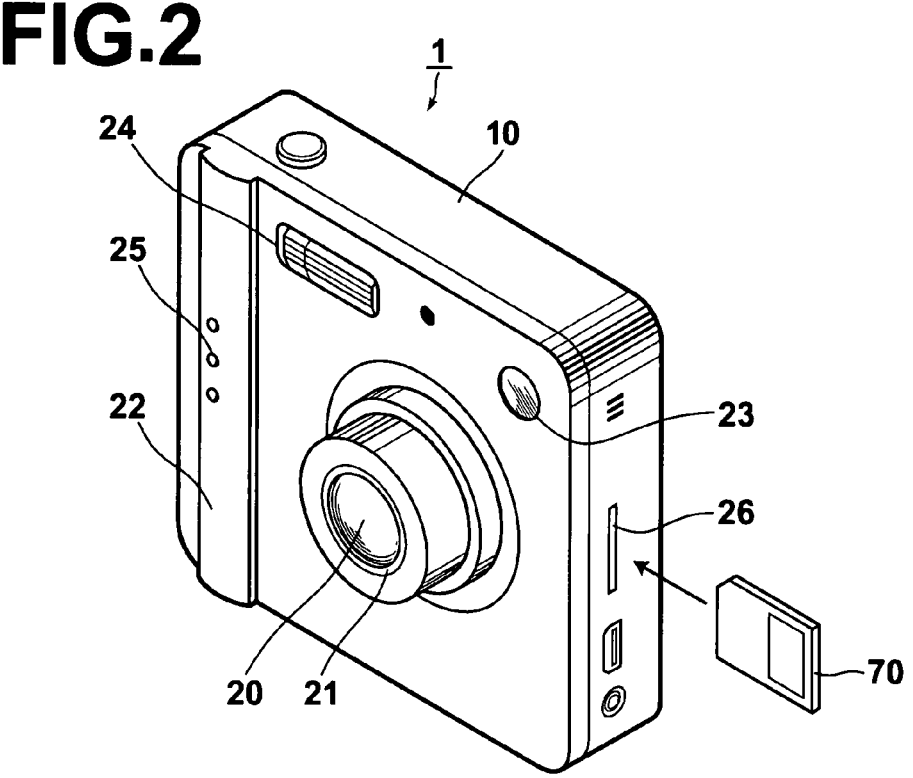
FIG. 2 is a front view of the digital camera

FIGS. 1 and 2 illustrate an example digital camera. FIG. 1 is an external view thereof viewed from the rear side, and FIG. 2 is an external view thereof viewed from the front side. An operation mode switch 11; a menu/OK button 12; a zoom/up-down lever 13; a right-left button 14; a back (return) button 15; display switching button 16; a finder 17 for imaging; and a monitor 18 for imaging and playback are provided on the rear side of the main body 10 of the digital camera 1 as the operation interface for the user as shown in FIG. 1. In addition, a shutter button 19 is provided on the upper side of the main body 10.

The operation mode switch 11 is a slide switch for selecting still image recording mode, moving picture imaging mode, or playback mode.

The menu/OK button 12 is a button for selecting imaging mode, flashlight emission mode, or displaying various menus on the monitor 18 for setting the number of recording pixels, sensitivity and the like, which are sequentially selected by depressing the button, and also for determining the selection/setting based on the menu displayed on the monitor 18.

The zoom/up-down lever 13 is moved in up/down directions when performing telephoto/wide angle control at the time of imaging, and performing cursor control on the menu screen displayed on the monitor 18 for various settings.

The right-left button 14 is used for moving the cursor in right/left directions on the menu screen displayed on the monitor 18 for various settings.

The back (return) button 15 is depressed when terminating the various settings and displaying an immediately preceding screen on the monitor 18.

The display switching button 16 is depressed when performing display ON/OFF switching of the monitor 18, displaying various guidance, performing character display ON/OFF switching, and the like.

The setting contents of each of the buttons and levers described above may be confirmed by a display on the monitor 18, a lamp within the finder 17, the position of the slide levers, or the like.

The finder 17 is provided for the user for monitoring and verifying the image composition and focus when performing imaging. The subject image monitored through the finder 17 is provided through a finder window 23 provided on the front side of the main body 10.

Further, when performing imaging, a through image for confirming the subject is displayed on the monitor 18. Thus, the monitor 18 functions as an electronic view finder, as well as functioning as a display for playbacking obtained still images or a moving image, or displaying various menus.

The shutter button has two states of operation, half and full depressions. The half depression serves as the trigger for setting imaging conditions for final imaging, and the full depression serves as the trigger for the final imaging.

As shown in FIG. 2, a taking lens (imaging optical system) 20, a lens cover 21, a power switch 22, the finder window 23, a flashlight 24, and a self-timer lamp 25 are provided on the front side of the main body 10. In addition, a media slot 26 is provided on a lateral side thereof.

The taking lens 20 is a lens for focusing a subject on a predetermined imaging surface (e.g., CCD provided inside of the main body 10, or the like), and includes a focus lens, a zoom lens, and the like.

The lens cover 21 is provided for covering the surface of the taking lens 20 to protect it from contamination, dust, and the like when the digital camera 1 is inactive, in playback mode, or the like.

The power switch 22 is a switch for activating or deactivating the digital camera 1.

The flashlight 24 is provided for instantaneously irradiating light to the subject required for imaging when the shutter button 19 is depressed and while the shutter provided inside of the main body is open.

The self-timer lamp 25 is provided for notifying the timing of open/close of the shutter when performing imaging using the self-timer.

The media slot 26 is provided for inserting an external recording medium 70, such as a memory card, or the like. When the external recording medium 70 is inserted therein, data read/write operations are performed.

Figure 3:
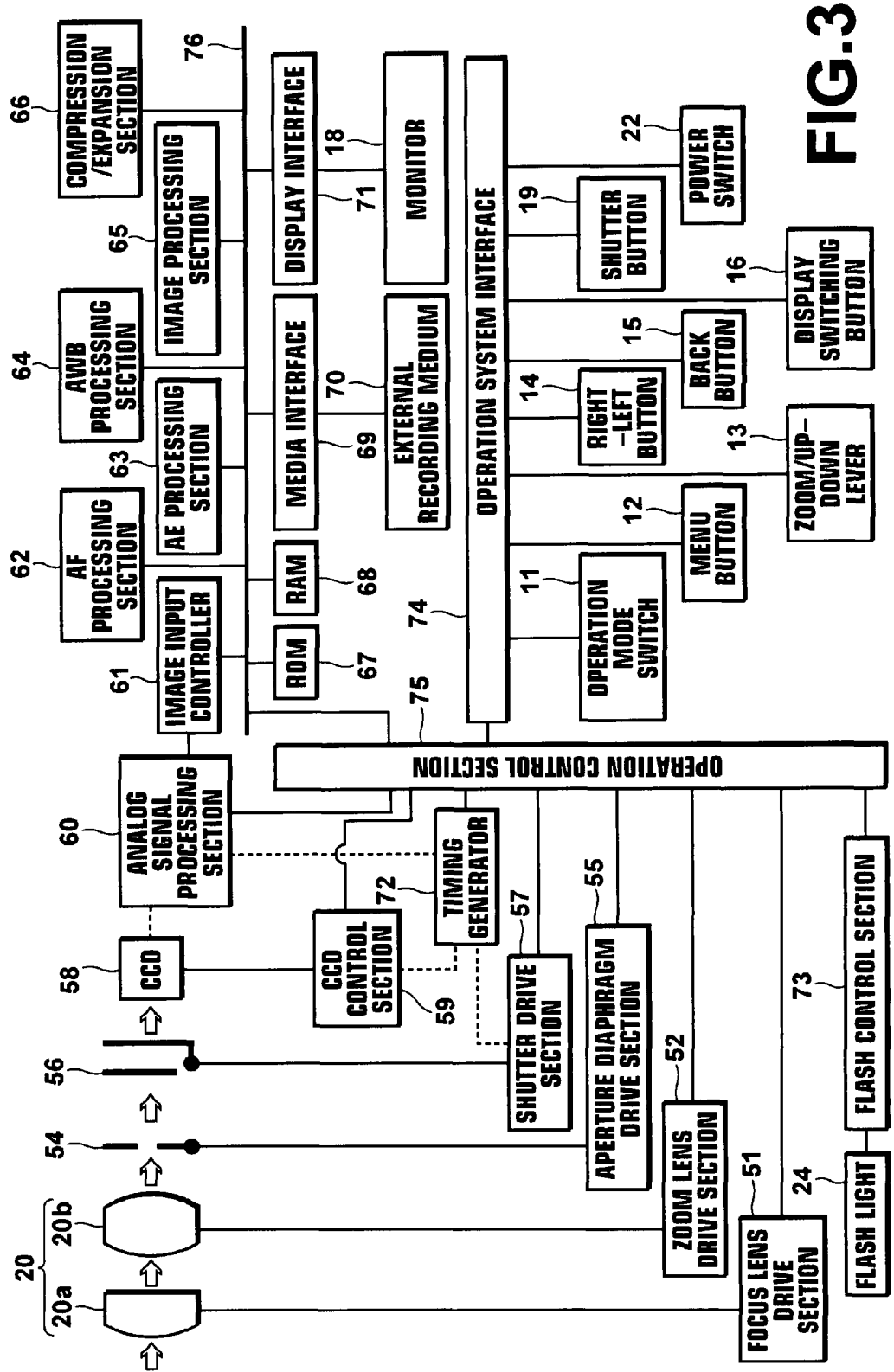
FIG. 3 is a functional block diagram of the digital camera.

FIG. 3 is a functional block diagram of the digital camera 1. The digital camera 1 includes: the operation mode switch 11; the menu/OK button 12; the zoom/up-down lever 13; the right-left button 14; the back (return) button 15; the display switching button 16; the shutter button 19; and the power switch 22 as the operation system thereof, in addition to the operation system interface 74 for conveying the operated states of these switches, buttons, and levers to the operation control section 75 as shown in FIG. 3.

The taking lens 20 includes a focus lens 20a and a zoom lens 20b. The lenses 20a and 20b are movable in the optical axis directions by the focus lens drive section 51 and zoom lens drive section 52 respectively, each of which including a motor and a motor driver. The focus lens drive section 51 drives the focus lens 20a based on focus control amount data obtained by the AF processing section 62, or step drives the focus lens 20a at a predetermined step width when contrast detection AF control is performed. The zoom lens drive section 52 controls the drive of the zoom lens 20b based on the data of operated amount of the zoom/up-down lever 13.

The aperture diaphragm 54 is driven by the aperture diaphragm drive section 55 that includes a motor and a motor driver. The aperture diaphragm drive section 55 regulates the aperture diameter of the aperture diaphragm based on aperture value data outputted from the AE (Automatic Exposure) processing section 63.

The shutter 56 is a mechanical shutter, and is driven by the shutter drive section 57 that includes a motor and a motor driver. The shutter drive section 57 performs open/close control of the shutter 56 based on a depressed signal of the shutter 19 and shutter speed data outputted from the AE processing section 63.

The CCD 58, the image sensor of the digital camera 1, is provided on the rear side of the optical system described above. The CCD 58 has a photoelectric surface that includes multitudes of light receiving elements disposed in a matrix form, and the subject image transmitted through the imaging optical system is focused on the photoelectric surface and subjected to a photoelectric conversion. A microlens array (not shown) for directing light to respective pixels, and a color filter array (not shown) including R, G, and B filters arranged regularly are disposed in front of the photoelectric surface. The CCD 58 outputs charges stored in the respective pixels line by line as serial analog image data in synchronization with a vertical transfer clock signal and a horizontal transfer clock signal supplied from the CCD control section 59. The charge storage time of each pixel (exposure time) is determined by an electronic shutter drive signal supplied from the CCD control section 59.

The analog image data outputted from the CCD 58 are inputted to the analog signal processing section 60. The analog signal processing section 60 includes: a correlated double sampling circuit (CDS) for removing noise from the analog image signals; an automatic gain controller (AGC) for regulating the gain of the analog image signals; and an A/D converter (ADC) for converting the analog image data to digital image data. The digital image data are CCD-RAW data in which each pixel has RGB density values.

The timing generator 72 is provided for generating timing signals, which are inputted to the shutter drive section 57, CCD control section 59, and analog signal processing section 60, thereby the operation of the shutter button 19, open/close of the shutter 56, charge acquisition in the CCD 58, and the processing in the analog signal processing section 60 are synchronized.

The flash control section 73 controls the emission of the flashlight 24 based on flash emission mode information, measured light intensity information, and the like.

The image input controller 61 stores the CCD-RAW data inputted from the analog signal processing section in the RAM 68.

The RAM 68 is a work memory used when various types of digital image processing (signal processing) are performed, and may be, for example, a SDRAM (Synchronous Dynamic Random Access Memory) that performs data transfer in synchronization with a bus clock signal having a constant frequency.

The display interface 71 is provided for causing the monitor 18 to display the image data stored in the RAM 68. The display interface 71 combines a luminance (Y) signal and color (C) signals into a composite signal, and outputs the composite signal to the monitor 18. When the digital still camera 1 is set to the imaging mode, through images based on charge reading from the CCD 58 at predetermined time intervals are displayed on the monitor 18. If it is set to the playback mode, an image stored in the external recording medium 70 is displayed.

The AF processing section 62, AE processing section 63, and AWB processing section 64 determine imaging conditions based on a pre-image. The pre-image is an image based on the image data stored in the RAM 68 as a result of pre-imaging performed by the CCD 58, which is caused by the operation control section 75 detecting a halfway depression signal generated when the shutter button 19 is depressed halfway. Here, a configuration may be adopted in which charge reading from the CCD 58 is performed at predetermined time intervals even when the shutter button 19 is not in the half depressed state, and the processing is performed based on the image data digitized by the analog signal processing section 60. The image data may be the same image data as a through image, the image data obtained at different readout timings.

The AF processing section 62 corresponds to the focus control amount determination apparatus of the present invention, and determines a drive amount (focus control amount) of the focus lens 20a based on the pre-image, the details of which will be described later.

The AE processing section 63 measures the luminance of the subject based on the pre-image, determines the aperture value, shutter speed, and the like based on a predetermined program diagram, and outputs aperture value data and shutter speed data.

The AWB processing section 64 performs an automatic white balance adjustment on a final image. The referent of "final image" as used herein means an image based on the image data stored in the RAM 68 which are obtained by the CCD 58 when the shutter button is fully depressed and outputted therefrom as analog image data and stored in the RAM 68 through the analog signal processing section 60 and the image input controller 61. The upper limit of the number of pixels of the final image is dependent on the number of pixels of the CCD 58. But the number of pixels for recording may be changed, for example, by image quality setting allowed to the user (fine, normal, or the like). In the mean time, the number of pixels for a through image or a pre-image may be less than that of a final image, e.g., 1/16 of the final image.

The image processing section 65 performs image quality corrections, such as gamma correction, sharpness correction, contrast correction, and the like on the image data of a final image. In addition, it performs YC processing in which CCD-RAW data are converted to Y data, which are luminance signal data, and YC data that include Cb data, which are blue chrominance difference signals, and Cr data, which are red chrominance difference signals.

The compression/expansion section 66 generates an image file by performing compression, for example, in JPEG format on the image data after processed by the image processing section 65 for image quality corrections. Auxiliary information is attached to the image file based, for example, on the Exif data format. Further, the compression/expansion section 66 reads out a compressed image file from the external recording medium 70 and performs expansion thereon in the playback mode. The expanded image data are outputted to the display interface 71, which causes the monitor 18 to display an image based on the image data.

The media interface 69 includes the media slot 26 in FIG. 2, and reads out an image file or the like recorded on the external recording medium 70, or records an image file thereon.

The operation control section 75 controls each section of the main body of the digital camera 1 in response to the signals from various buttons, levers, switches, and each of the functional blocks.

The data bus 76 is connected to the image input controller 61, various processing sections 62 to 67, RAM 68, interfaces 69, 71, and operation control section 75, and transmission and reception of various signals and data are performed through the data bus 76.

The ROM 67 includes various processing/control programs, reference data, and the like.

Various physical implementation methods for the functions shown in FIG. 3 to the digital still camera 1 are conceivable. For example, the analog signal processing section 60 and the timing generator 72 may be integrated on a single chipset. Further, the image input controller 61, AF processing section 62, AE processing section 63, AWB processing section 64, image processing section 65, compression/expansion section 66, media interface 69, and display interface 71 may be integrated on a single chipset. Still further, the aforementioned chipsets may further include the operation control section 75 and the operation system interface 74, or the ROM and RAM. Further, Data processing performed in the AF processing section 62, AE processing section 63, AWB processing section 64, image processing section 65, and compression/expansion section 66 may be implemented as a specialized hardware circuit for the processing, or it may be implemented by means of software, in which programs for performing each process is executed on a general purpose chip.

An operation flow in the digital camera 1 according to user operation will now be described with reference to the flowchart in FIG. 4. After the power switch 22 is switched on by the user, a determination is made by the operation control section 75 whether the operation mode is imaging mode or playback mode according to the setting of the operation mode switch 11 (step S1). If the operation mode is playback mode (step S1: Playback), playback operation for an image is performed (step S12). The playback operation is an operation in which an image file is read out from the external recording medium 70 by the media control section 69 to tentatively store the image data in the RAM 68, and an image based on the image data stored in the RAM is displayed on the monitor 18. When the playback operation is completed, a determination is made by the operation control section 75 whether deactivation operation is performed through the power switch 22 of the digital camera 1 (step S10). If the determination result is positive (step S10: Yes), the power of the digital camera 1 is switched off and the process is terminated.

If the operation mode is determined to be imaging mode in step S1 (step S1: Imaging), a through image is displayed (step S2). More specifically, analog image data outputted from the CCD 58 by charge reading are converted to digital CCD-RAW data through CDS, AGC and ADC in the analog signal processing section 60, and the CCD-RAW data are stored in the RAM 68 by the image input controller 61, which are then converted to composite signals by the display interface 71 and displayed on the monitor 18. In the case of a through image, a series of the processes described above is performed at a predetermined time intervals and the displayed image is updated, so that a moving-picture-like image is displayed on the monitor 18.

The operation control section 75 monitors whether the shutter button 19 is depressed halfway (step S3). If the determination result is negative (step S3: No), the display of the through image (step S2) and detection of halfway depression of the shutter button 19 are repeated by the operation control section 75.

When an imaging angle is determined by the user, monitoring at the through image displayed on the monitor 18, or monitoring through the finder 17, by aiming the taking lens 20 at the subject and moving the zoom lens 20b as required by operating the zoom/up-down lever 13, and the shutter button 19 is depressed halfway, the halfway depression of the shutter 19 is detected by the operation control section 75 (step S3: Yes) and an instruction to obtain a pre-image is issued from the operation control section 75.

In response to the instruction described above, charge reading in performed in the CCD 58 regardless of the charge reading for the through image, and outputted analog data are converted to digital CCD-RAW data through CDS, AGC and ADC in the analog signal processing section 60, and the CCD-RAW data are stored in the RAM 68 by the image input controller 61. An image based on the CCD-RAW data is a pre-image (step S4).

Next, an exposure determination process is performed (step S5). More specifically, the luminance of the subject is measured based on the obtained pre-image by the AE processing section 63, and the exposure, i.e., an aperture value and a shutter speed are determined based on the reference data indicating the program diagram stored in the ROM 67 in advance, and aperture value data and shutter speed data are outputted. Further, in response to the instruction from the operation control section 75, the diameter of the aperture diaphragm is regulated by the aperture diaphragm drive section 55 based on the outputted aperture value data. Further, depending of the measurement results of the subject luminance, the flash light 24 is set to emit when the shutter button 19 is depressed fully to perform a final imaging.

Then, a focus control process is performed (step S6). More specifically, a drive amount "f" and a drive direction "d" of the focus lens 20a are determined by the AF processing section 62, and the focus lens 20a is moved in the optical axis directions by the focus lens drive section 51 based on the drive amount "f" and the drive direction "d". The focus control process will be described in detail later in the first and second embodiments of the present invention.

In the operation control section 75, a determination is made whether the halfway depression of the shutter button 19 is released (step S7). If the determination result is positive (step S7: Yes), the display of a through image is performed again (step S2). If the determination result is negative (step S7: No), a determination is repeated whether the shutter button 19 is fully depressed (step S8). If the determination result is positive (step S8: Yes), an instruction to perform imaging is issued by the operation control section 75 (step S9). In response to the instruction, a timing signal is generated timely by the timing generator 72, and the open/close of the shutter 56, acquisition of the charges by the CCD 58, processes in the analog signal processing section 60 are synchronized. The shutter drive section 57 closes the shutter 57, and reopens it according to the shutter speed obtained by the AE processing section 63. Then, the charges stored in the CCD 58 while the shutter is being opened are read out by the CCD control section 59, and analog image data representing the subject image formed on the photoelectric surface of the CCD 58 are outputted. The outputted analog image data are converted to digital CCD-RAW data through CDS, AGC and ADC in the analog signal processing section 60, and the CCD-RAW data are stored in the RAM 68 by the image input controller 61. Further, a known white balance adjustment is performed on the image of the CCD-RAW data stored in the RAM 68 by the AWB processing section 64 based on a predetermined setup condition. Still further, image quality corrections, such as gamma correction, sharpness correction, contrast correction, and the like, are performed by the image processing section 65 in addition to the conversion to YC data.

After the imaging is completed, the operation control section 75 instructs to display the obtained image on the monitor 18, as well as causing the compression/expansion section 66 to perform compression on the processed and converted image data, then to generate an image file in Exif format by attaching auxiliary information, such as imaging conditions and the like to the compressed image data, and to record the image file on an external recording medium 70 through the media interface 69 (step S10). Thereafter, the operation control section 75 determines whether a deactivation operation is performed through the power switch 22 (step S11). If the determination result is positive (step S11: Yes), the power of the digital camera 1 is switched off, and the process is terminated. If the determination result is negative (step S11: No), the process returns to the determination step of operation mode (step S1).

Figure 4:
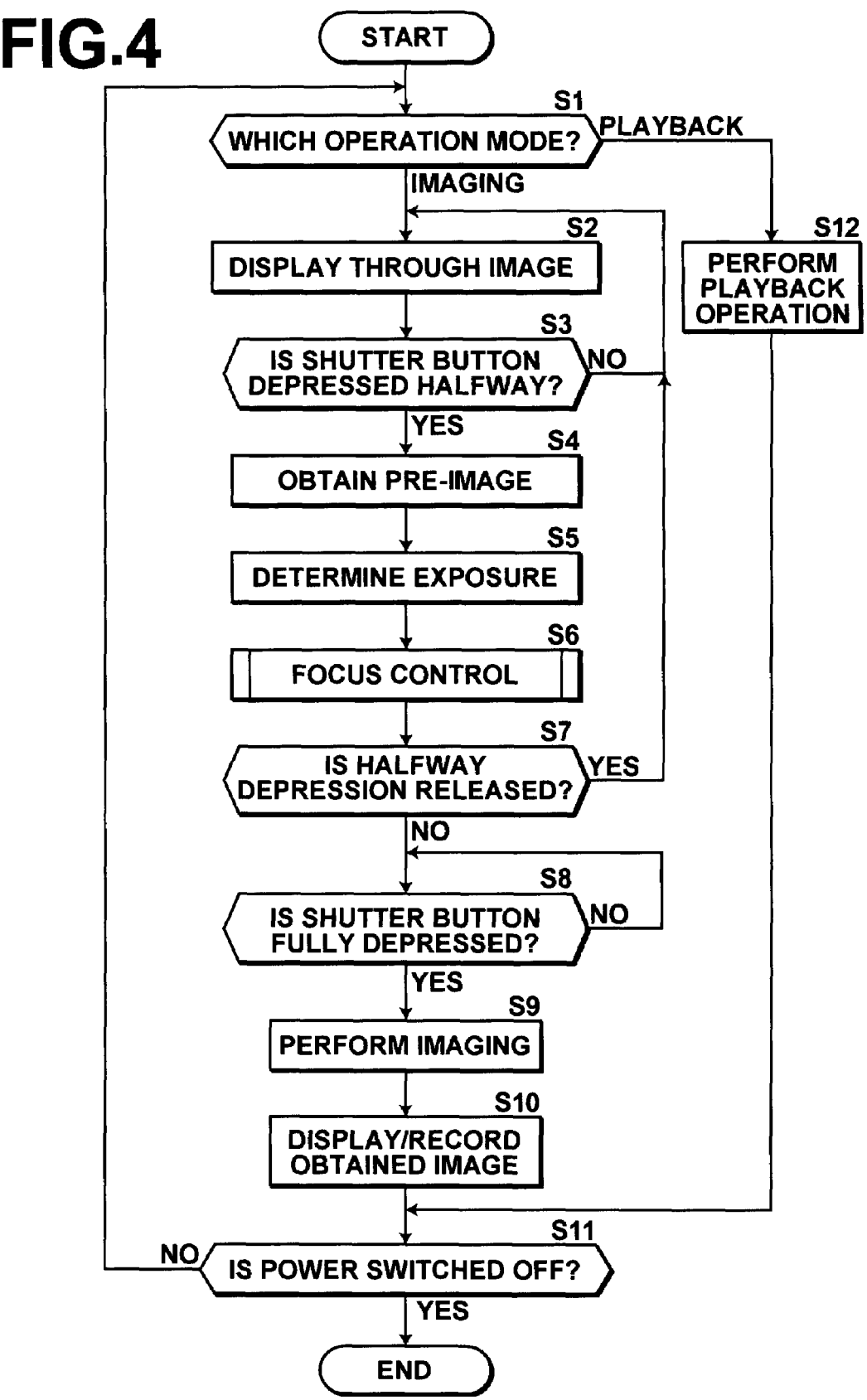
FIG. 4 is a flowchart for explaining an operation flow of the digital camera according to user operation.
Figure 5:
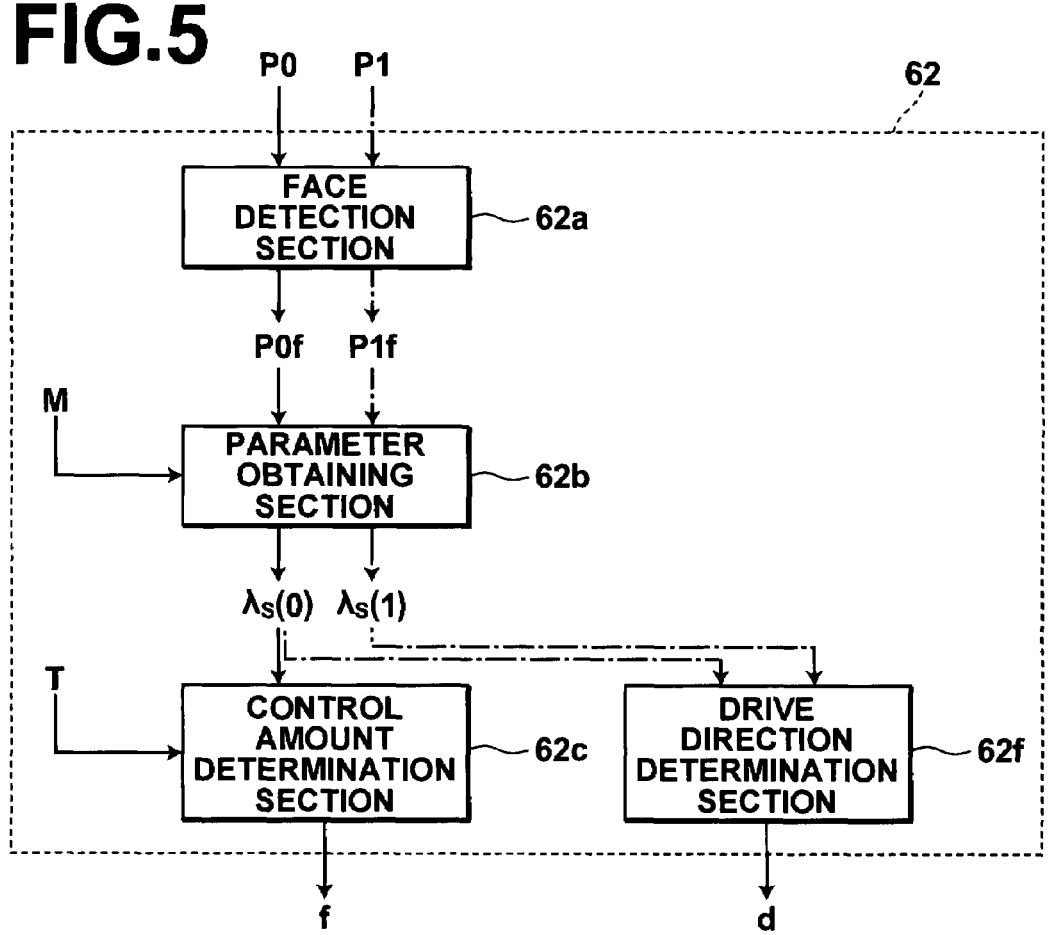
FIG. 5 is a block diagram of the focus control amount determination process according to a first embodiment of the present invention, schematically illustrating the functional configuration and data flow thereof.

FIG. 5 is a block diagram schematically illustrating a functional structure and a data flow of a focus control amount determination process according to a first embodiment of the present invention, which is included in focus control amount determination processes performed in the AF processing section 62 in portrait mode (step S6 in FIG. 4). As illustrated, the focus control amount determination process according to the first embodiment is realized by: a face detection section 62a for detecting a face portion of an image; a parameter obtaining section 62b for obtaining a sharpness parameter $\lambda_s$ by applying the detected face portion to a mathematical model M generated by AAM (refer to reference document 1) based on a plurality of sample images representing human face portions in different sharpness levels, the sharpness parameter $\lambda_s$ being used for weighting a principal component representing the sharpness level of the mathematical model M according to the detected face portion; a control amount determination section 62c for obtaining a drive amount "f" of the focus lens 20a corresponding to a value $\lambda_s(0)$ of sharpness parameter obtained by the parameter obtaining section 62b by applying a face portion P0f detected by the face detection section 62a from a pre-image to the mathematical model M based on a reference table T that indicates the correlation between the sharpness parameter value $\lambda_s$ and the drive amount "f" of the focus lens 20a required for obtaining an image focused on the face portion P0f; and a drive direction determination section 62f for determining a drive direction "d" of the focus lens 20a by making a comparison between a sharpness parameter $\lambda_s(1)$ obtained by the parameter obtaining section 62b by applying a face portion P1f detected by the face detection section 62a from a drive direction determination image P1 obtained after the focus lens 20a is driven to the "near side" from the current position by a predetermined amount, and the sharpness parameter $\lambda_s(0)$.

The face detection section 62a detects a face portion from an input image using a known face detection technique. For example, the following method as described in Japanese Unexamined Patent Publication No. 2005-108195 (reference document 2) may be used. That is, a determination is made whether a face candidate region is present in the image by inputting a first characteristic amount indicating the direction of a gradient vector representing the direction and magnitude of an edge at each pixel to a plurality of first discriminators (to be described later). If a face candidate region is present, the region is extracted, and the magnitude of the gradient vector at each pixel on the extracted region is normalized. Then, a determination is made whether the extracted face candidate region is a true face region by inputting a second characteristic amount indicating the magnitude and direction of the normalized gradient vector to a second discriminator (to be described later), and if it is determined to be a true face region, the region is extracted as the face portion. Here, the first/second discriminators are generated through a learning process of a machine learning technique, such as AdaBoost or the like, which uses, as input, the first/second characteristic amounts calculated for a plurality of images known to be of faces and a plurality of images known to not be of faces, which are sample images for learning.

Various known techniques may be used for detecting the face portion, which may include: a method that uses a correlation score between a unique face expression and the image itself as described in PCT Japanese Publication No. 2004-527863 (reference document 3), knowledge database, characteristics extraction, flesh color detection, template matching, graph matching, statistical methods (neural network, SVM, HMM), and the like.

Figure 6:
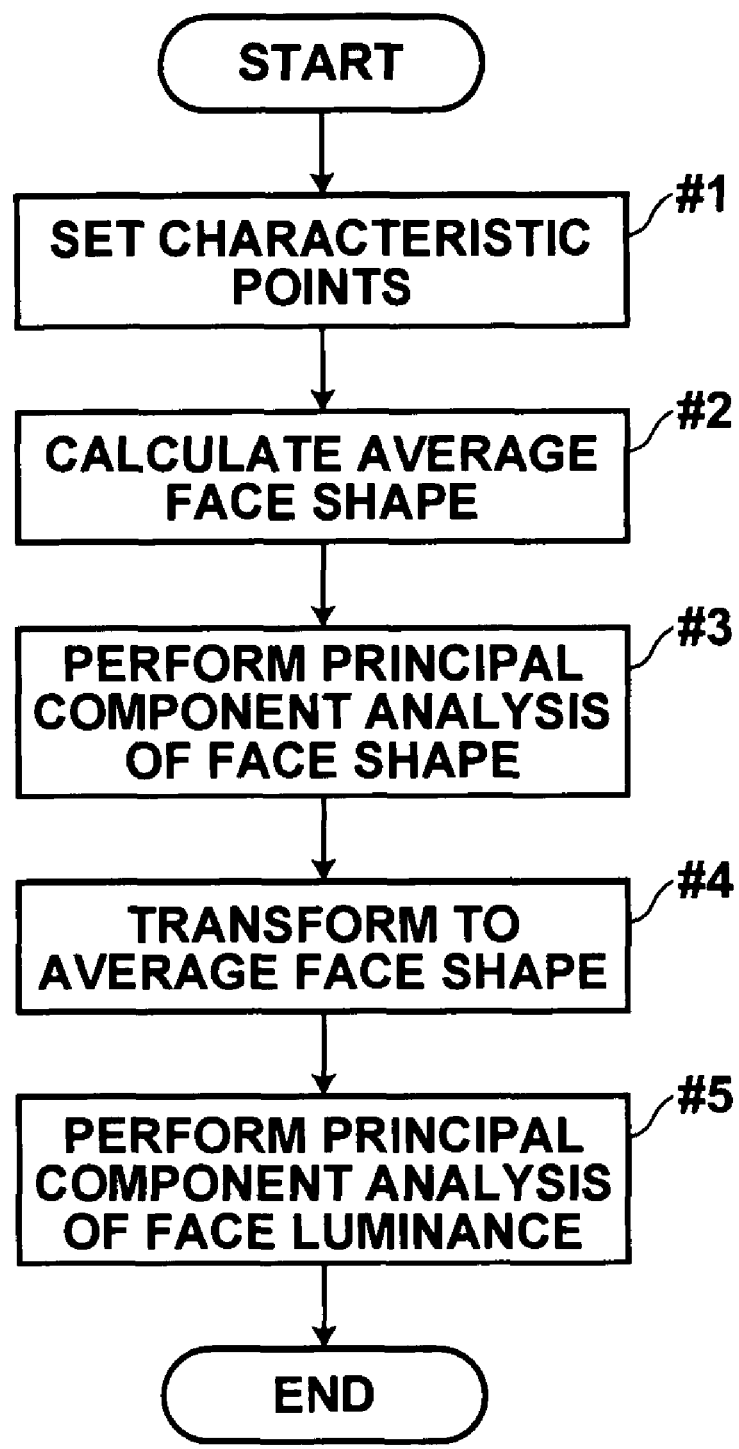
FIG. 6 is a flowchart illustrating a process flow for generating a mathematical model of face image according to the present invention.

The mathematical model M is generated based on the flowchart shown in FIG. 6, and pre-stored in the ROM 67 at the time of shipping of the digital camera 1. A generation process of the mathematical model M will now be described.

Figure 7:
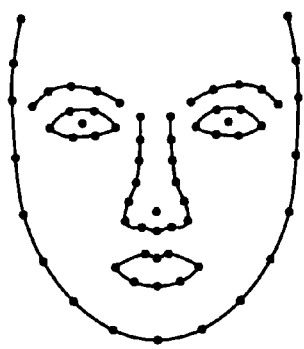
FIG. 7 illustrates example characteristic points set on a face.

First, characteristic points representing a face shape are set on each of a plurality of face images (sample images) as shown in FIG. 7 (step #1). Here, the number of characteristic points is 122 (FIG. 7 indicates only 60 characteristic points for clarity) Location of each of the characteristic points is predefined like, for example, the first characteristic point is at the left end of the left eye, the $38^{th}$ characteristic point is at the midpoint between the eyebrows, and the like. Each characteristic point may be set either manually or automatically through a recognition process. It may be corrected manually as required after automatic setting.

Then, an average face shape is calculated based on the characteristic points set on each of the sample images (step #2). More specifically, average values of position coordinates of the characteristic points representing the same region on the respective sample images are obtained.

Figure 8:
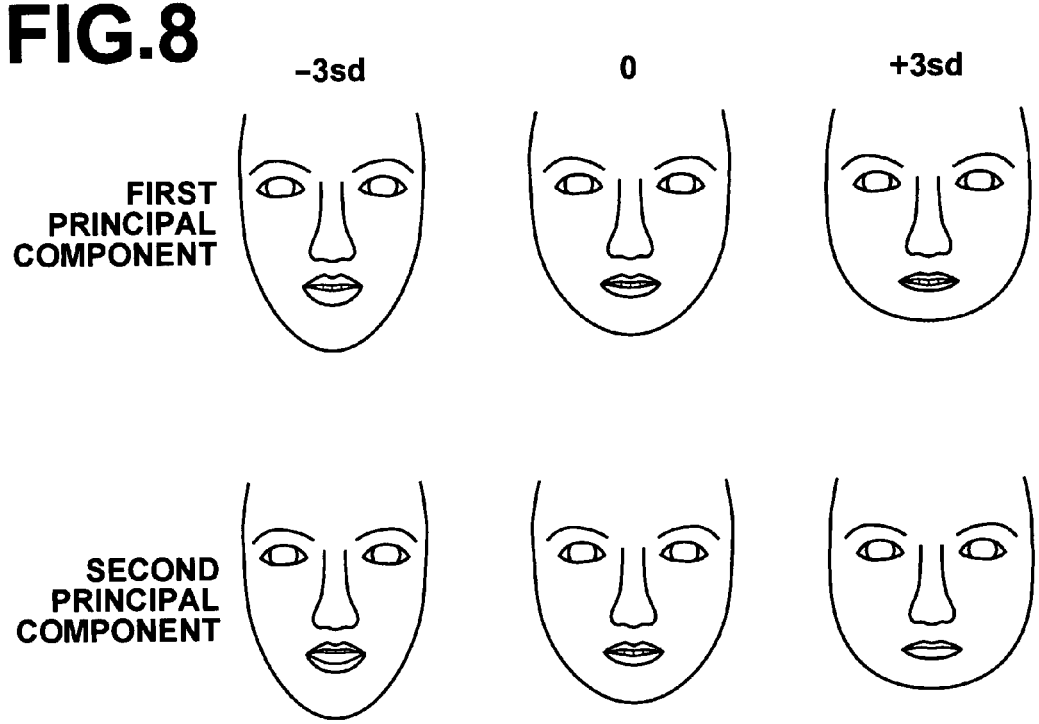
FIG. 8 schematically illustrates the variation in face shapes when the value of the weighting factor for a unique vector of a principal component obtained by a principal component analysis for a face shape is varied.

Further, a principal component analysis is performed based on the characteristic points representing the face shape in each of the sample images and the position coordinates of the average face shape (step #3). As a result, any face shape may be approximated by the following formula (1).

$$S = S_0 + \sum_{i=1}^{n} p_i b_i \quad (1)$$

where: S is the shape vector on which the position coordinates of each characteristic point of a face shape are arranged $(x_1, y_1, \text{---} x_{122}, y_{122})$; $S_0$ is the average face shape vector on which the position coordinates of each characteristic point on the average face shape are arranged; $p_i$ is a unique vector representing the $i^{th}$ principal component of the face shape obtained by the principal component analysis; and $b_i$ is a weighting factor for each unique vector $p_i$. FIG. 8 schematically illustrates how the face shape varies when the values of the weighting factors $b_1$ and $b_2$ for the unique vectors $p_1$ and $p_2$ of the top two principal components obtained by the principal component analysis are varied. The variation width is from −3sd to +3sd, which is based on the standard deviation sd of the values of the weighting factors $b_1$ and $b_2$ when the face shape of each sample image is represented by the formula (1) above. The face shape in the center of the three face shapes in each principal component is the average face shape. This example shows that a component contributing to the contour shape of the face is derived as the first principal component as a result of the principal component analysis, and the face shape varies from an elongated face (−3sd) to a round face (+3sd) by varying the weighting factor $b_1$. Similarly, components contributing to open/close states of the mouth and jaw length are derived as the second principal component, and the face shape varies from a face with long jaw and open mouth (−3sd) to a face with short jaw and closed mouth (+3sd) by varying the weighting factor $b_2$. Note that a smaller value of i has stronger explanatory power of the shape. That is, it means a greater contribution to the face shape.

Figure 9:
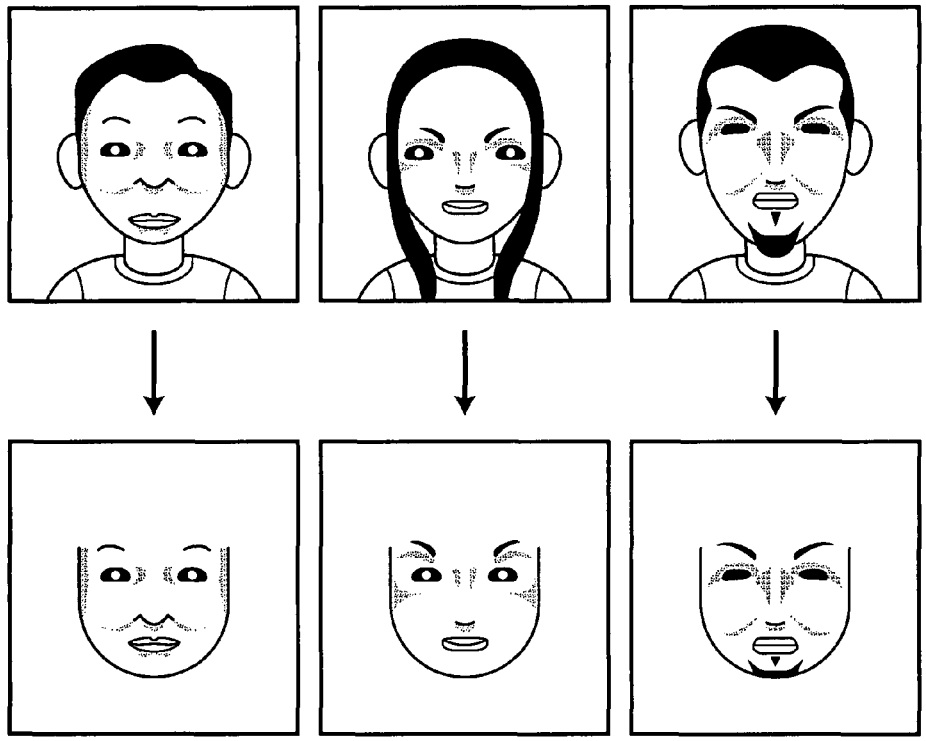
FIG. 9 illustrates that the face shapes in sample images are transformed into an average face shape, and indicating the luminance thereof under the average face shape.

Next, each of the sample images is transformed (warped) to the average face shape obtain in step #2 (step #4). More specifically, the amount of shift for each of the characteristic points between each of the sample images and the average face shape is calculated, and based on the calculated amount of shift, an amount of shift of each of the sample images to the average face shape on a pixel basis is calculated by the following formulae (2) to (5) (two dimensional quintic polynomial), and each of the sample images is warped to the average face shape on a pixel basis.

$$x' = x + \Delta x \quad (2)$$

$$y' = y + \Delta y \quad (3)$$

$$\Delta x = \sum_{i=0}^{n} \sum_{j=0}^{n-1} a_{ij} \cdot x^i \cdot y^j \quad (4)$$

$$\Delta y = \sum_{i=0}^{n} \sum_{j=0}^{n-1} b_{ij} \cdot x^i \cdot y^j \quad (5)$$

where: x and y are the coordinates of each characteristic point in each sample image; x' and y' are coordinates on the average face shape to be warped; $\Delta x$ and $\Delta y$ are amounts of shift to the average shape; "n" is the order; and $a_{ij}$ and $b_{ij}$ are coefficients. The coefficients for polynomial approximation are obtained by the least squares method. Here, for a pixel whose coordinate value after warping is not an integer value, and moved to a position including a fractional part, the pixel value thereof is obtained from four adjacent pixels by first order approximation. That is, the pixel value thereof is distributed to four surrounding pixels in proportion to the distance between the coordinate thereof to each of the pixels after warping. FIG. 9 illustrates that face shapes of three sample images are transformed into an average face shape.

Further, a principal component analysis is performed with the luminance of each pixel of each of the sample images after transformed into the average face shape as a parameter (step #5). As a result, the luminance of any face image under the average face shape may be approximated by the following formula (6).

$$A = A_0 + \sum_{i=1}^{m} q_i \lambda_i \quad (6)$$

where: A is a luminance vector on which the luminance of each pixel under the average face shape is arranged ($a_1$, --- $a_m$; 1 to m are suffixes for identifying each pixel; m is the total number of pixels on the average face shape); A0 is an average face luminance vector on which the average luminance value of each pixel of each sample image in the average face shape is arranged; $q_i$ is a unique vector representing the $i^{th}$ principal component of the face luminance obtained by the principal component analysis; and $\lambda_i$ is a weighting factor for each unique vector $q_i$. Note that the principal component having a smaller value of order i has stronger explanatory power of the luminance. That is, it means a greater contribution to the face luminance.

Figure 10:
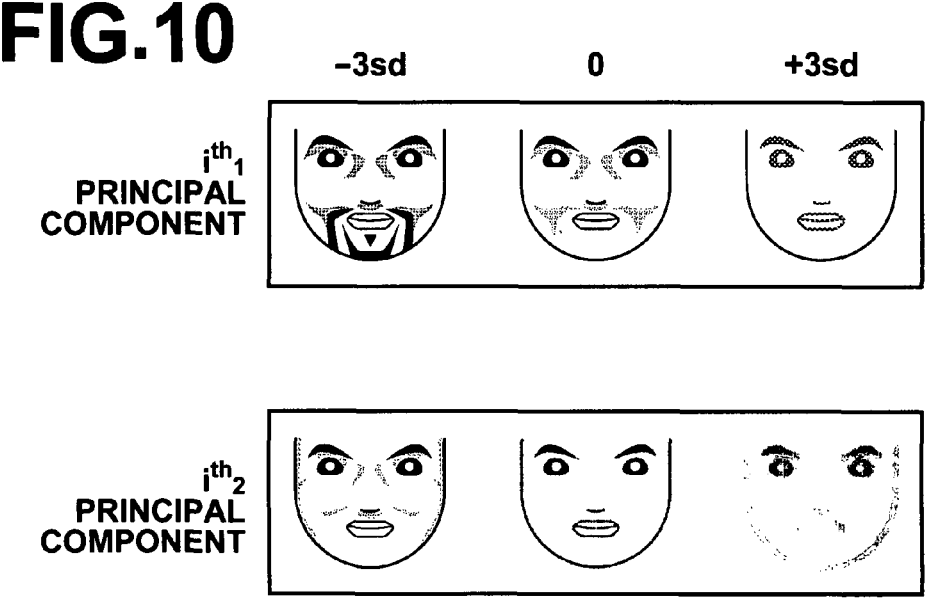
FIG. 10 schematically illustrates the variation in face luminance when the value of the weighting factor on a unique vector of a principal component obtained by principal component analysis for face luminance is varied.

FIG. 10 schematically illustrates how the pixel values of faces vary when the values of the weighting factors $\lambda_{i1}$ and $\lambda_{i2}$ for the unique vectors $q_{i1}$ and $q_{i2}$ representing the $i^{th}_1$ and $i^{th}_2$ principal components respectively obtained through the principal component analysis are varied. The variation width is from −3sd to +3sd, which is based on the standard deviation sd of the values of the weighting factors $\lambda_{i1}$ and $\lambda_{i2}$ when the pixel values of the face of each sample image are represented by the formula (6) above. The face shape in the center of the three face shapes in each principal component is the average face shape. This example shows that a component contributing to the existence or nonexistence of beard is derived as the $i^{th}_1$ principal component as a result of the principal component analysis, and the face varies from a face with dense beard (−3sd) to a face without beard (+3sd) by varying the weighting factor $\lambda_{i1}$. Similarly, a component contributing to sharpness is derived as the $i^{th}_2$ principal component, and the weighting factor for the component is the sharpness parameter $\lambda_s$. This example shows that the face varies from a face with an emphasized contour (−3sd) to a blurred face (+3sd) by varying the sharpness parameter $\lambda_s$. Which principal component is contributing to which element is determined by human interpretation. The principal component contributing to the sharpness is not necessarily extracted as the first principal component. Further, the sharpness level is not necessarily represented by a single principal component, and may be explained by a plurality of principal components.

The mathematical model M of a face is generated through steps #1 to #5 described above. That is, the mathematical model M is represented by a plurality of unique vectors $p_i$ representing face shapes and unique vectors $q_i$ representing pixel values of faces under the average face shape, which is dimension compressed in which the total number of each type of unique vectors is far smaller than the number of pixels forming the face image. Note that in the embodiment described in the reference document 1, a mathematical model of a face image with 23 unique vectors for the face shape, and 114 unique vectors for the pixel values of face is generated by setting 122 characteristic points for an image formed of 10,000 pixels and performing the aforementioned process, and it is described that 90% of variations in the shape and pixel value may be represented by varying the weighting factor for each unique vector.

The parameter obtaining section 62b applies a face portion of an input image to the mathematical model M. More specifically, it reconstructs the image based on the formulae (1) and (6) described above by varying the values of the weighting factors $b_i$ and $\lambda_i$ for the unique vectors $p_i$ and $q_i$ from the top principal components in formulae (1) and (6), and obtains the weighting factors $b_i$ and $\lambda_i$ when the difference between the reconstructed image and the face portion of the input image is minimal (refer to the reference document 3 for detail). Note that it is preferable that the range of the values of the weighting factors $b_i$ and $\lambda_i$ be based on the standard deviations sd of the distributions of $b_i$ and $\lambda_i$ when the sample images are represented by the formulae (1) and (6) at the time of generating the model, and limited to, for example, from −3sd to +3sd, and if the values do not fall in the range, the average values of the distributions be used. This may prevent an erroneous application of the model.

The reference table T defines the correlation between the sharpness parameters and the drive amounts "f" of the focus lens 20a experimentally or statistically obtained in advance. That is, how much the focus lens needs to be driven for each possible sharpness parameter value $\lambda_s$ in order to obtain an image focused in the face portion of an input image is experimentally or statistically obtained, and each obtained drive amount "f" is associated with each sharpness parameter value $\lambda_s$.

The control amount determination section 62c refers to the reference table T, and obtains the drive amount "f" of the focus lens 20a corresponding to the sharpness parameter value $\lambda_s$.

A function that outputs the drive amount "f" with the sharpness parameter $\lambda_s$ as input may be defined, and the drive amount "f" is obtained by the control amount determination section 62c based on the function without using the reference table T.

In the foregoing, the description is made on the assumption that only one principal component exists, representing sharpness, i.e., sharpness parameter. In the case where sharpness is represented by a combination of a plurality of principal components, the drive amount "f" may be defined in the reference table T for each combination of values of weighting factors for the plurality of the principal components. Alternatively, a new parameter "C" may be obtained as a linear combination of each weighting factor as shown in the following formula (7) ($\alpha_i$ is a coefficient that indicates a contribution level to sharpness of a principal component corresponding to the weighting factor $\lambda_i$), and the drive amount "f" may be defined for each value of the parameter "C".

$$C = \sum_{i=1}^{j} \alpha_i \lambda_i \tag{7}$$

Further, the drive amount "f" may be obtained by a high-dimensional reference table that associates combinations of values of respective weighting factors and values of new parameters "C". Still further, a function that outputs the drive amount "f" with each of the weighting factors $\lambda_1, \lambda_2, ---, \lambda_j$ as input may be defined.

Based on the sharpness parameter value $\lambda_s(0)$ of the pre-image P0, and the sharpness parameter value $\lambda_s(1)$ of the drive direction determination image P1 obtained after the focus lens 20a is driven to the "near side" by a predetermined amount, the drive direction determination section 62f determines whether the sharpness of the face portion has become more favorable by driving the focus lens 20a to the "near side". More specifically, difference between an optimum sharpness parameter value $\lambda_{s0}$, experimentally or statistically obtained in advance, and each of the sharpness parameter values $\lambda_s(0)$ and $\lambda_s(1)$ is obtained ($\Delta\lambda_s(0)$ and $\Delta\lambda_s(1)$ respectively), and if $\Delta\lambda_s(0) \geq \Delta\lambda_s(1)$, then the sharpness of the face portion is determined to have become more favorable. If the optimum sharpness parameter value $\lambda_{s0}$ is a maximum or minimum value of possible sharpness parameter values, a determination may be made whether the sharpness of the face portion has become more favorable according to the magnitude relation between the sharpness parameter values $\lambda_s(0)$ and $\lambda_s(1)$. If the sharpness of the face portion is determined to have become more favorable by driving the focus lens 20a to the "near side", the drive direction "d" of the focus lens 20a is determined to be "near side", and if not, the drive direction "d" of the focus lens 20a is determined to be "telephoto side".

Figure 11:
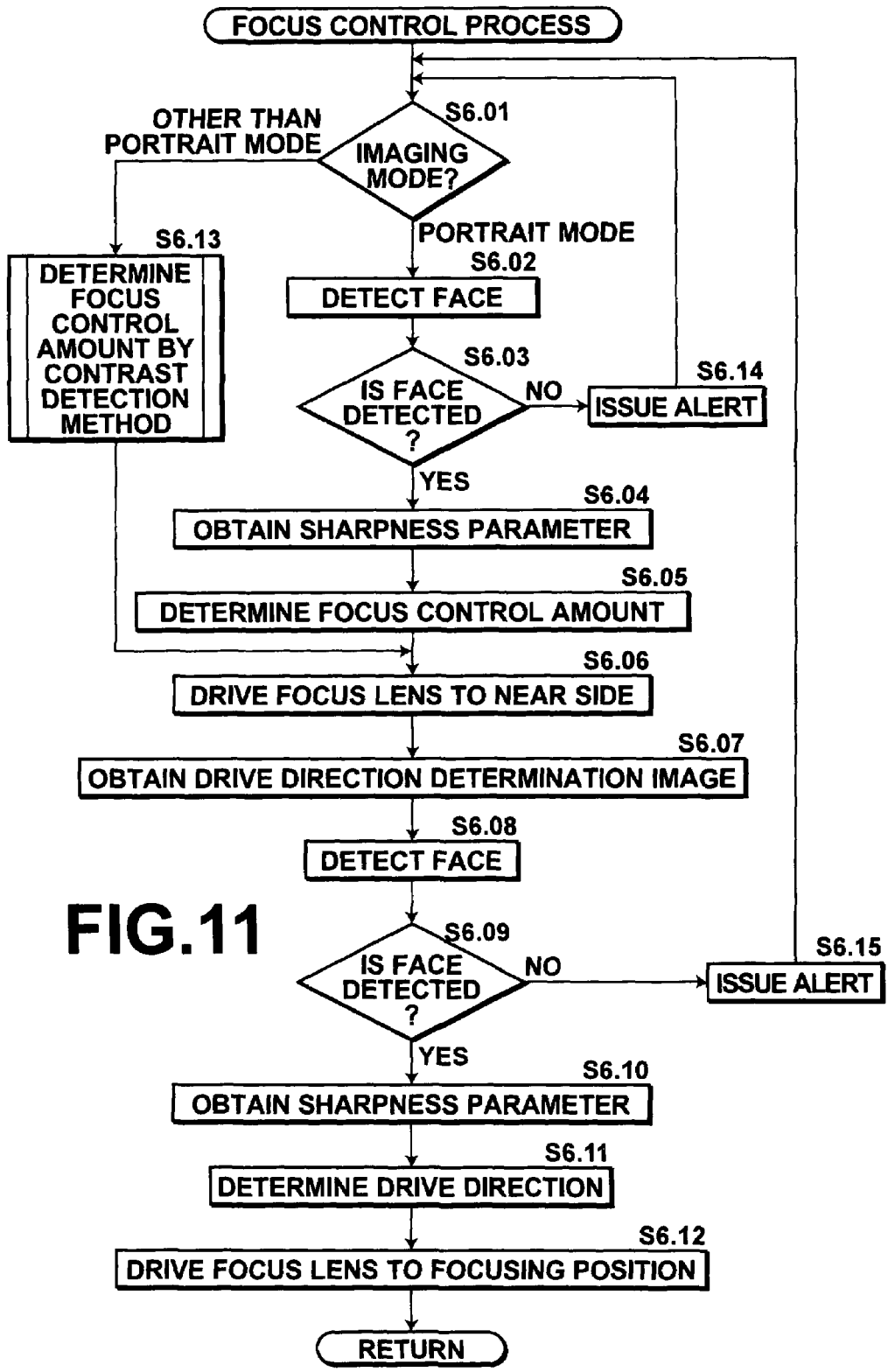
FIG. 11 is a flowchart of the focus control amount determination process according to the first embodiment of the present invention illustrating the flow thereof.

A focus control process including the focus control amount determination process according to the first embodiment of the present invention (step S6 in FIG. 4) will now be described with reference to the flowchart illustrated in FIG. 11. First, the AF processing section 62 determines whether the imaging mode is set to portrait mode (step S6.01). If the imaging mode is set to other than portrait mode (step S6.01: Other Than Portrait), such as Landscape mode, Automatic Imaging mode, and the like, the position of the focus lens 20a is determined by a known contrast detection system, and a drive amount "f" for moving the focus lens 20a to the position is calculated (step S6.13). On the other hand, if the imaging mode is portrait mode (step S6.01: Portrait), a face portion P0f is detected from a pre-image P0 by the face detection section 62a (step S6.02). If the face portion is not detected from the pre-image P0 (step S6.03: No), an alert message notifying of this is displayed on the monitor 18 to prompt the user to change the imaging mode or imaging angle (step S6.14). If the face portion P0f is detected (step S6.03: Yes), the parameter obtaining section 62b obtains a sharpness parameter value $\lambda_s(0)$ of the face portion P0f by applying the detected face portion P0f to the mathematical model M (step S6.04), and the control amount determination section 62c obtains a drive amount "f" corresponding to the parameter value $\lambda_s(0)$ obtained by the parameter obtaining section 62b based on the reference table T (step S6.05). Here, in response to the instruction from the operation control section 75, the focus lens drive section 51 drives the focus lens 20a to the "near side" by a predetermined amount (step S6.06), and a drive direction determination image P1 representing a subject image focused on the photoelectrical surface of the CCD 58 through the focus lens 20a located at the position is obtained (step S6.07). More specifically, charge reading is performed in the CCD 58, and analog image data representing the subject image focused on the photoelectric surface of the CCD 58 through the focus lens 20a located at the position are outputted. The outputted analog image data are converted to digital CCD-RAW data through CDS, AGC and ADC in the analog signal processing section 60, and the CCD-RAW data are stored in the RAM 68 by the image input controller 61. The image represented by the CCD-RAW data is the drive direction determination image P1. Then, a face portion P1f is detected from the drive direction determination image P1 by the face detection section 62a in the same manner as in the steps 6.02 to 6.04 (step S6.08). If the face portion P1f is detected (step S6.09: Yes), the parameter obtaining section 62b obtains a sharpness parameter value $\lambda_s(1)$ of the face portion P1f by applying the detected face portion P1f to the mathematical model M (step S6.10). If the face portion P1f is not detected (step S6.09: No), an alert message notifying of this is displayed on the monitor 18 to prompt the user to change the imaging mode or imaging angle as in step S6.14 (step S6.15). The drive direction determination section 62f determines whether the sharpness of the face portion has been improved by moving the focus lens 20a to the "near side" (step S6.06) base on the sharpness parameter values $\lambda_s(0)$ and $\lambda_s(1)$ obtained by the parameter obtaining section 62b to determine the drive direction "d" (step S11). Then, the focus lens drive section 51 drives the focus lens 20a to the in-focus position based on the drive amount "f" and drive direction "d" (step S6.12). More specifically, if the determined drive direction "d" is to the "near side", the focus lens 20a is driven by an amount obtained by subtracting the drive amount in step S6.06 from the drive amount "f", while if the determined drive direction "d" is to the "telephoto side", the focus lens 20a is driven to the "telephoto side" by an amount obtained by adding the drive amount in step S6.06 to the drive amount "f".

As described above, in the first embodiment of the present invention, the following are performed in the AF processing section 62 when the imaging mode of the digital still camera 1 is set to portrait mode: the parameter obtaining section 62b obtains a sharpness parameter value $\lambda_s(0)$ of the face portion P0f by applying the face portion P0f detected from the pre-image P0 by the face detection section 62a to the mathematical model M generated by AAM based on a plurality of sample images representing human face portions under different sharpness levels; the control amount determination section 62c obtains a drive amount "f" of the focus lens 20a corresponding to the obtained parameter value $\lambda_s(0)$; and the focus lens drive section 51 drives the focus lens 20a based on the obtained drive amount "f" and drive direction "d" determined by the drive direction determination section 62f. This may eliminate the influence of sharpness in the area other than the face portion of a person, the major subject of an image, and allows highly accurate focus state of the face portion P0f based only on the sharpness of the face portion P0f in auto-focus control, so that an image representing a face of a person in more favorable state may be obtained by imaging the person under the focus of the taking lens 20 controlled according to the determined control amount "f".

Further, the control amount determination section 62c obtains a drive amount "f" corresponding to the parameter value $\lambda_s$ obtained by the parameter obtaining section 62b based on the reference table T that indicates correlation between the sharpness parameter value $\lambda_s$ and the drive amount "f" of the focus lens 20a. This eliminates the need to obtain an image at each position of the focus lens by sequentially moving the position of the focus lens as in the conventional contrast detection system. Consequently, power consumption and processing time for moving the focus lens may be saved.

Note that the drive amount of the focus lens 20a in step S6.07 described above may be a value corresponding to the drive amount "f" obtained by the control amount determination section 62c. If that is the case, the drive amount of the focus lens 20a in step 6.12 becomes zero when the drive direction is determined to the "near side" in the drive direction determination section 62f (step S6.11). Further, the drive direction in step S6.07 may be to the "telephoto side". Still further, the drive direction may be determined whether to the "near side" or to the "telephoto side" according to the position of the focus lens 20a at the time of obtaining the pre-image P0.

Figure 12:
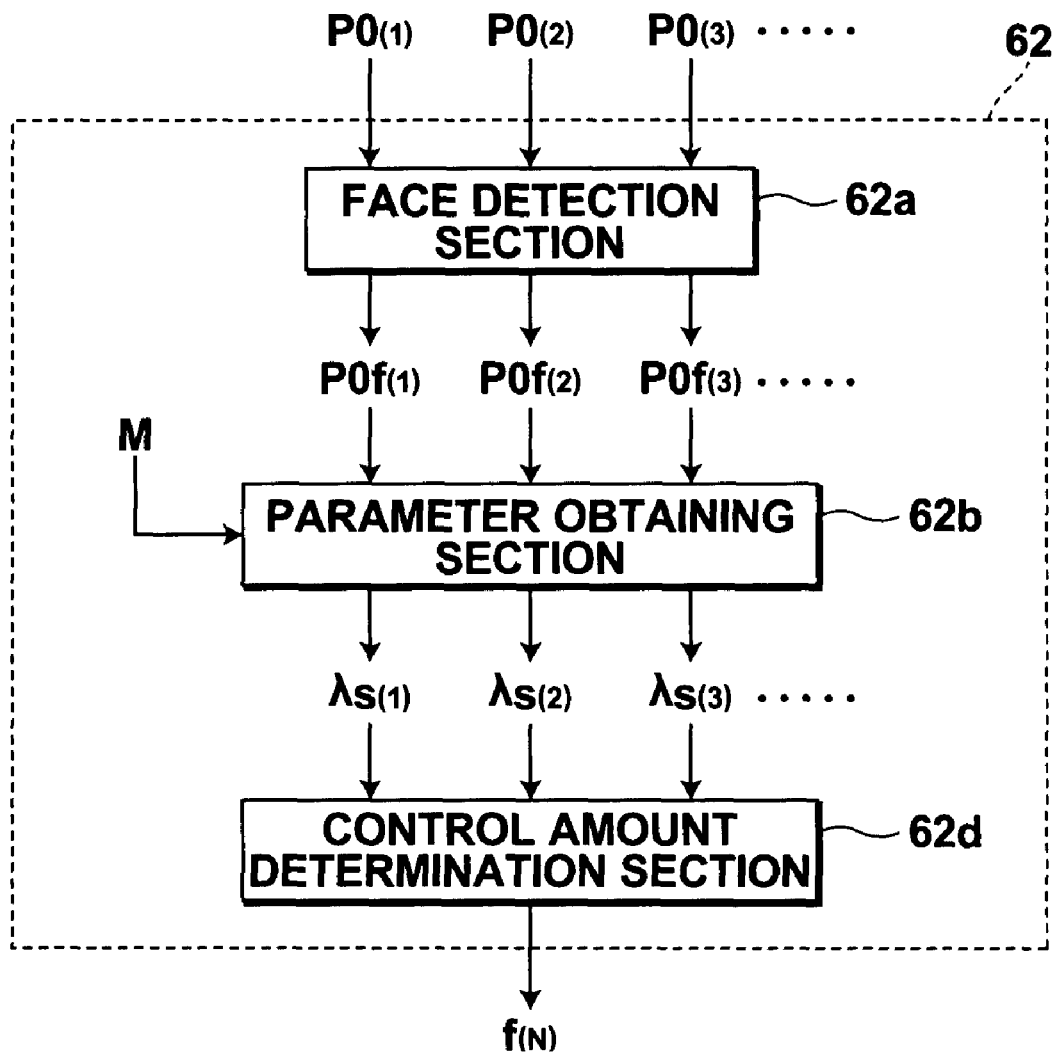
FIG. 12 is a block diagram of the focus control amount determination process according to a second embodiment of the present invention, schematically illustrating the functional configuration and data flow thereof.

FIG. 12 is a block diagram schematically illustrating a functional structure and a data flow of a focus control amount determination process according to a second embodiment of the present invention, which is included in focus control amount determination processes performed in the AF processing section 62 in portrait mode (step S6 in FIG. 4). As illustrated, the focus control amount determination process according to the second embodiment is realized by: a face detection section 62a for performing a face detection process on sequentially inputted images P0(1), P0(2), P0(3) - - - represented by image data stored in the RAM 68 obtained by sequentially moving the focus lens 20a at a predetermined step width, and performing charge reading in the CCD 58 at each step, which are processed in the analog signal processing section 60 and image input controller 61 before stored in the RAM 68, to detect face portions P0f(1), P0f(2), P0f(3) - - - ; a parameter obtaining section 62b for obtaining sharpness parameter values $\lambda_s(1)$, $\lambda_s(2)$, $\lambda_s(3)$ - - - according to each of the face portions by applying each of the face portions P0f(1), P0f(2), P0f(3) - - - to the mathematical model M; and a control amount determination section 62d for selecting a sharpness parameter value ($\lambda_s(N)$), which is most favorable as the sharpness of the face portion, from among the obtained sharpness parameter values $\lambda_s(1)$, $\lambda_s(2)$, $\lambda_s(3)$ - - -, and obtaining a drive amount f(N) for moving the focus lens 20a from the last position of the step drive to the position where an image P0(N) corresponding to the sharpness parameter value $\lambda_s(N)$ was obtained. In the present embodiment, the drive direction "d" of the focus lens 20a is from the last position of the step drive toward the initial position.

In the structure described above, the processes performed in the face detection section 62a and the parameter obtaining section 62b are identical to those in the first embodiment.

The control amount determination section 62d select a sharpness parameter value ($\lambda_s(N)$), which has a minimum difference from an optimum sharpness parameter value $\lambda_{s0}$ experimentally or statistically obtained in advance, from the sharpness parameter values $\lambda_s(1)$, $\lambda_s(2)$, $\lambda_s(3)$ - - - as the most favorable sharpness for the face portion, and obtains the drive amount f(N) for moving the focus lens 20a from the last position of the step drive to the position where an image P0(N) corresponding to the sharpness parameter value $\lambda_s(N)$ was obtained.

Figure 13:
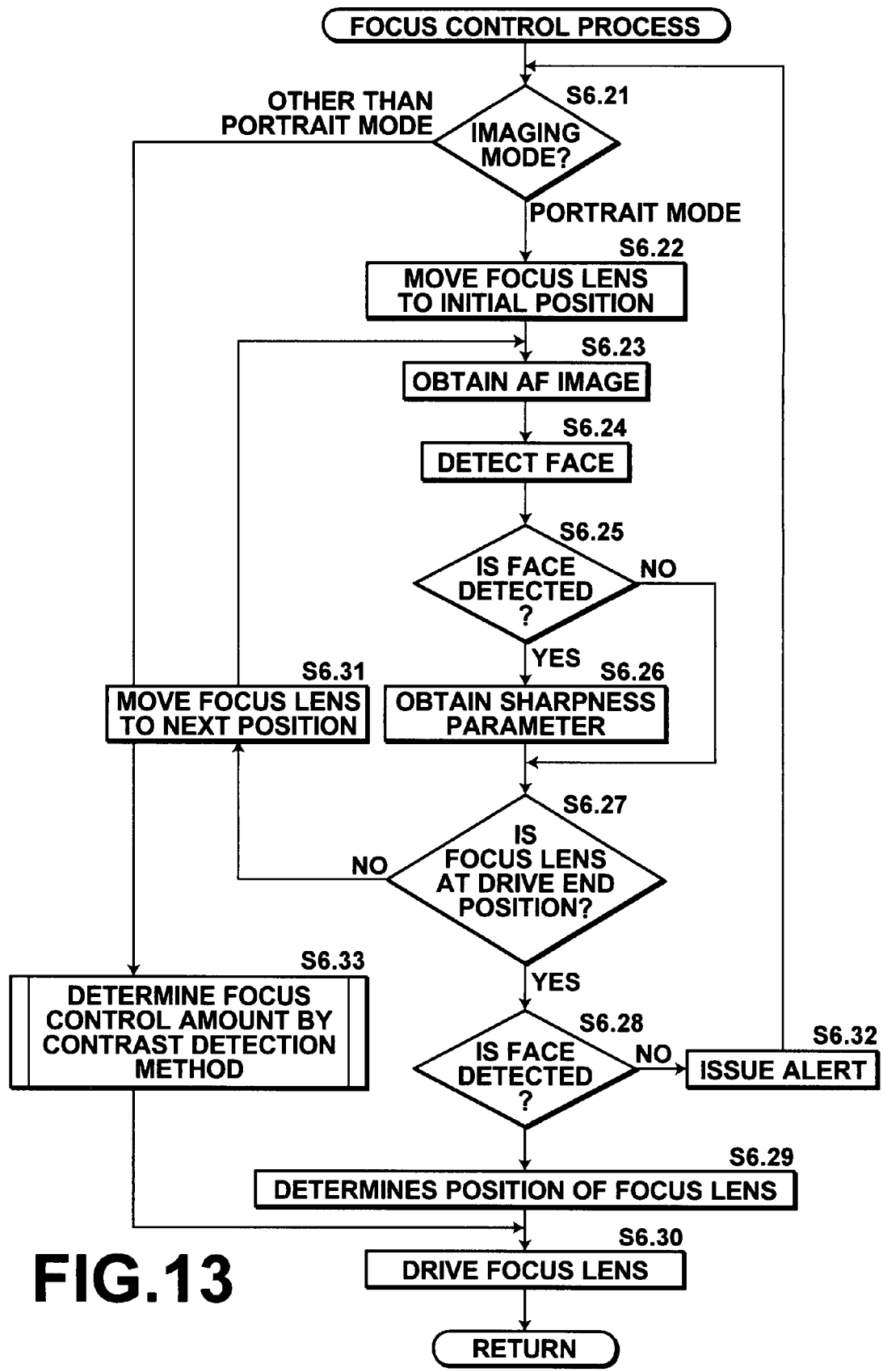
FIG. 13 is a flowchart of the focus control amount determination process according to the second embodiment of the present invention illustrating the flow thereof.

A focus control process including the focus control amount determination process according to the second embodiment of the present invention (step S6 in FIG. 4) will now be described with reference to the flowchart illustrated in FIG. 13. First, the AF processing section 62 determines whether the imaging mode is set to portrait mode (step S6.21). If the imaging mode is set to other than portrait mode (step S6.21: Other Than Portrait), such as Landscape mode, Automatic Imaging mode, and the like, the position of the focus lens 20a is determined by a known contrast detection system, and a drive amount "f" for moving the focus lens 20a to the position is calculated (step S6.33). On the other hand, if the imaging mode is portrait mode (step S6.21: Portrait), the focus lens drive section 51 moves the focus lens to the initial position (e.g., nearest side) (step S6.22), and an AF image P0(1) representing a subject image focused on the photoelectric surface of the CCD 58 through the focus lens 20a located at the position is obtained (step S6.23). More specifically, charge reading is performed in the CCD 58, and analog image data representing the subject image focused on the photoelectric surface of the CCD 58 through the focus lens 20a located at the position are outputted. The outputted analog image data are converted to digital CCD-RAW data through CDS, AGC and ADC in the analog signal processing section 60, and the CCD-RAW data are stored in the RAM 68 by the image input controller 61. The image represented by the CCD-RAW data is the AF image P0(1). Then, the face portion P0f(1) is detected from the AF image P0(1) by the face detection section 62a (step S6.24). If the face portion P0f(1) is detected (step S6.25: Yes), the parameter obtaining means 62b obtains the sharpness parameter value $\lambda_s(1)$ of the face portion P0f by applying the detected face portion P0f to the mathematical model M (step S6.26) If a face portion is not detected from the AF image P0(1) (step S6.25: No), the process of the parameter obtaining section is skipped. Then, a determination is made whether the position of the focus lens 20a is a drive end position (e.g., telescope end) (step S6.27). Currently, the focus lens 20a locates at the initial position, and not at the drive end position (step S6.27: No), so that the focus lens is step moved to the next position by the focus lens drive section 51 (step S6.31), where the processes for obtaining AF image P0(2) (step S6.23), detecting the face portion P0f(2), and obtaining the sharpness parameter values $\lambda_s(2)$ (step S6.26) are performed in the same manner as described above. Similar processes (steps S6.23 to S6.27, and S31) are repeated until the focus lens 20a reaches the drive end position to obtain the sharpness parameters $\lambda_s(1), \lambda_s(2), \lambda_s(3)$, - - - at the respective positions of the focus lens 20a. When the focus lens 20a reaches the drive end position (step S6.27: Yes), a determination is made whether a face portion is detected at least once, i.e. whether a sharpness parameter is obtained (step S6.28). If a face portion is not detected at all (step S6.28: No), an alert message notifying of this is displayed on the monitor 18 to prompt the user to change the imaging mode or imaging angle (step S6.32). If a face portion is detected at least once (step S6.28: Yes), the control amount determination section 62d selects a sharpness parameter value ($\lambda_s(N)$), which is most favorable as the sharpness of the face portion, from among the sharpness parameter values $\lambda_s(1), \lambda_s(2), \lambda_s(3)$ - - - obtained by the parameter obtaining section 62b. Then, the control amount determination section 62d determines the position of the focus lens 20a, where the image P0(N) corresponding to the sharpness parameter value $\lambda_s(N)$ was obtained, as the in-focus position, and obtains a drive amount f(N) for moving the focus lens 20a from the drive end position to the in-focus position (step S6.19). Thereafter, in response to the instruction from the operation control section 75, the focus lens drive section 51 drives the focus lens 20a toward the initial position thereof based on the drive amount f(N) (step S6.30).

As described above, in the second embodiment of the present invention, the following are performed in the AF processing section 62 when the imaging mode of the digital still camera 1 is set to portrait mode: the focus lens drive section 51 sequentially moves the focus lens 20a at a predetermined step width; the face detection section 62a obtains image data P0(i) (i=1, 2, - - -) representing an image at each step and detects the face portion P0f(i) of the image; the parameter obtaining means 62b obtains the sharpness parameter $\lambda_s(i)$ of the detected face portion P0f(i) by applying the face portion P0f(i) to the mathematical model M; and the control amount determination section 62d selects a sharpness parameter value ($\lambda_s(N)$), which is most favorable as the sharpness of the face portion, from among the sharpness parameter values $\lambda_s(1), \lambda_s(2), - - - \lambda_s(i), - - -$, and obtains a drive amount f(N) for moving the focus lens 20a to the position where the image P0(N) corresponding to the sharpness parameter value $\lambda_s(N)$ was obtained. This may eliminate the influence of sharpness in the area other than the face portion of a person, the major subject of an image, and allows highly accurate focus state of the face portion P0f based only on the sharpness of the face portion P0f in autofocus control as in the first embodiment, so that an image representing a face of a person in more favorable state may be obtained by imaging the person under the focus of the taking lens 20 controlled according to the determined control amount f(N).

In the present embodiment, the face detection (step S6.24) is performed at each position of the focus lens 20a. But in portrait mode in which a subject is assumed to stand still, an arrangement may be adopted in which the face detection process is performed first until a face is detected, and after a face is detected, the face detection process is omitted, and the parameter obtaining process (step S6.26) is performed on the portion of the AF image, as the face portion, obtained at the next position of the focus lens 20a corresponding to the initially detected face portion. This may reduce the processing time and improve the efficiency. Here, if the subject moves or the imaging angle is changed, there may be a case in which the face does not present in the portion of the subsequent image corresponding to the position where a face is initially detected. In such a case, the parameter value exceeds a predetermined allowable range, so that the user may be alerted to such event as an error.

In the foregoing two embodiments, face images are represented using separate weighting factors $b_i$ and $\lambda_i$ for face shape and luminance respectively. There is a correlation between the face shape and luminance variations, so that an appearance parameter "c", a new parameter, for controlling both the face shape and pixel values of luminance may be obtained by performing a principal component analysis on a vector $(b_1, b_2, - - -, b_i, - - -, \lambda_1, \lambda_2 - - -, \lambda_i - - -)$ obtained by combining the weighting factors $b_i$ and $\lambda_i$ as shown in the following formulae (8) and (9).

$$S = S_0 + Q_S c \qquad (8)$$

$$A = A_0 + Q_A c \qquad (9)$$

Here, the variance in the shape from the average face shape is represented by the appearance parameter "c" and the vector $Q_s$, and the variance element in the luminance from the average pixel values of face is represented by the appearance parameter "c" and the vector $Q_A$.

When this model is used, the parameter obtaining section 62b obtains the pixel values of face under the average face shape based on the formula (9) above by varying the value of the appearance parameter "c", and further reconstructs a face image by transforming the average face shape based on the formula (8) above, and obtains the appearance parameter "c" when the difference between the reconstructed image and the face portion P0f' becomes minimal.

Figure 14:
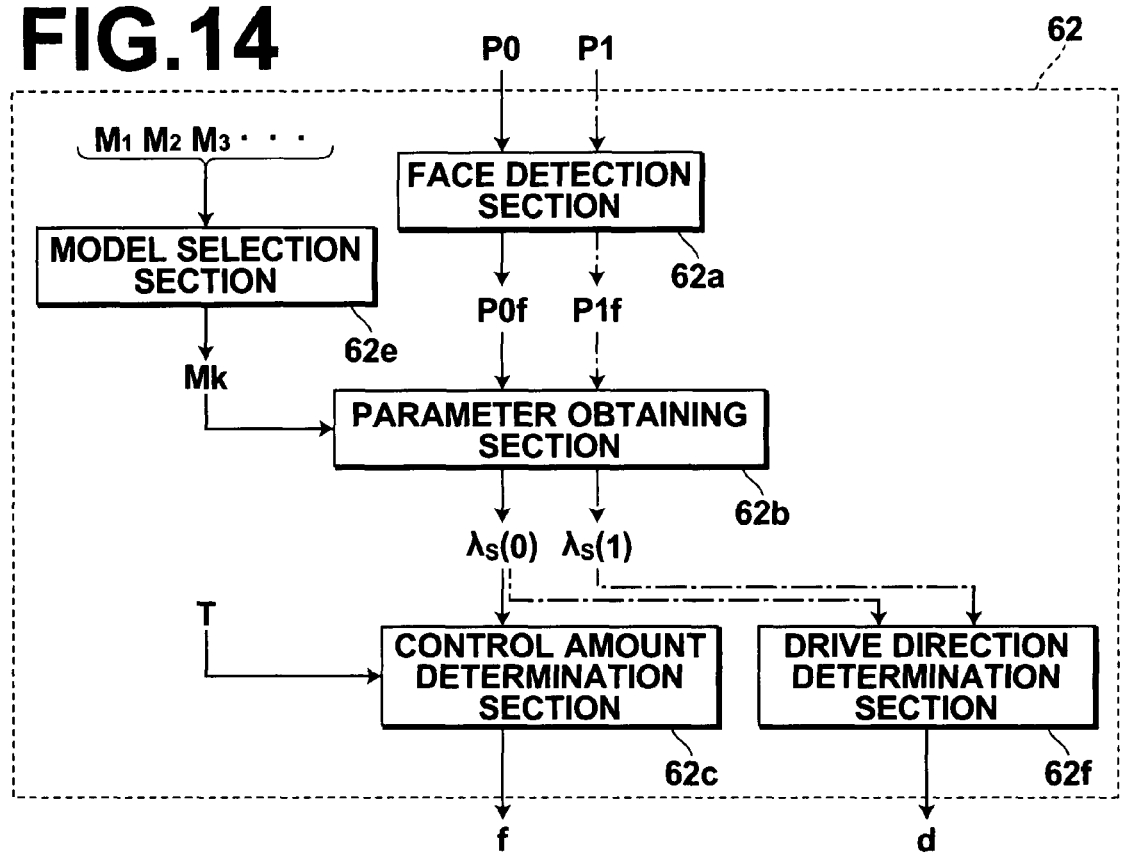
FIG. 14 is a block diagram of a modified example of the focus control amount determination process according to the first embodiment of the present invention, schematically illustrating the functional configuration and data flow thereof.

In the foregoing two embodiments, only a single mathematical model M is stored in the ROM 67, but a plurality of mathematical models $M_i$ (i=1, 2, - - -) may be generated and stored therein, each for each attribute, such as human race, age, and gender. FIG. 14 is a block diagram illustrating a focus control amount determination process when a plurality of mathematical model M according to the first embodiment is used. As illustrated, the embodiment differs from the first embodiment (FIG. 5) in that it further includes: a plurality of mathematical models $M_i$ (i=1, 2, - - -), and a model selection section 62e for selecting a mathematical model $M_k$ from the plurality of mathematical models $M_i$.

Here, each of the plurality of mathematical models $M_i$ is generated, for example, from a sample image group representing subjects of the same race, age, gender, or the like based on the aforementioned method (FIG. 6). The attribute of each model may be a combination of a plurality of attributes or a single attribute, which depends on the attributes of the sample images when the model is generated.

The model selection section 62e causes the monitor 18 to display a list of models stored in the ROM 67 when the user operates various buttons, such as the menu/OK button and the like, to select a model selection menu for setting details of portrait mode while monitoring the display on the monitor 18. In the list, character information indicating the attribute that characterizes each model $M_i$ (i=1, 2, - - -) is displayed, like, for example, "model M1: Yellow Race; Twenties; Male". Instead of the character information or in addition thereto, an icon may be displayed. The model selection section 62e accepts a desired model selected by the user through operation of the zoom/up-down lever, right-left button or the like. For example, if GPS information for imaged location is available, the country or region corresponding to the GPS information may be identified. Noting that the race of the subject may be estimated from the GPS information to a certain degree, an arrangement may be adopted in which mathematical models $M_i$ (i=1, 2, - - -), each for each race, and a reference table T2 for associating the GPS information with race information are stored in the ROM 67 in advance; an obtaining means for obtaining GPS information is further provided; and the obtaining means obtains GPS information when portrait mode is selected; the model selection section 62e accesses the reference table T2 to obtain race information corresponding to the GPS information obtained by the obtaining means, and automatically selects the model $M_k$ corresponding to the race information; and the parameter obtaining means 62b applies a face portion of an input image to the selected model $M_k$.

In this way, if the arrangement is adopted in which a plurality of mathematical models Mi is provided, each for each attribute, in advance, and the model selection section 62e selects a mathematical model from the plurality of models $M_i$, no unique vector for explaining the variation in the face shape or luminance arising from the difference in the attributes is present in the mathematical model $M_k$, so that the application accuracy to the model is improved, and a more accurate sharpness parameter may be obtained, thereby the focus control amount is determined more accurately and a higher quality image may be obtained.

Preferably, the attribute-based mathematical models are further specialized, and individual-based mathematical models are generated from the viewpoint of the processing accuracy.

In the embodiments described above, it is assumed that the mathematical model is preinstalled on the digital still camera 1. But, it is also preferable to provide race-based mathematical models in advance, and to select the mathematical model according to the shipping country or the region of the camera from the viewpoint of improving the processing accuracy.

Further, the function to generate the mathematical model may be implemented in the digital still camera 1. More specifically, a program for performing the process explained based on the flowchart shown in FIG. 6 may be store in the ROM 67, and a processing section for executing the program may be further provided. It is also possible to store a default mathematical model in the ROM 67 at the time of shipping the digital still camera 1, and then to customize (modify) the mathematical model or generating a new model which is different from the default mathematical model using images obtained by the camera 1. This is particularly effective when the individual-based mathematical models are generated.

What is claimed is:

1. A focus control amount determination apparatus, comprising:

a detection means for detecting a predetermined structure within a subject from inputted image data obtained through digital conversion of an image of the subject generated on an imaging surface, formed of an image sensor, by focusing the light from the subject through an imaging optical system;

a parameter obtaining means for obtaining a sharpness parameter that represents a weighting value for a statistical characteristic amount representing a sharpness level of the structure by applying the structure detected by the detection means to a model, which represents the structure by means of: one or more statistical characteristic amounts, including the statistical characteristic amount representing the sharpness level of the structure, obtained by performing a predetermined statistical processing on image data representing a plurality of images that represent the predetermined structure in different sharpness levels; and a weighting parameter for weighting each of the statistical characteristic amounts according to each of the characteristics of the structure; and a control amount determination means for determining the focus control amount for the imaging optical system such that the structure within the subject of the image is brought into focus according to the obtained value of the sharpness parameter.

2. The focus control amount determination apparatus according to claim 1, wherein the control amount determination means comprises:

a storage section for storing information indicating the correlation between the values of the sharpness parameter and focus control amounts of the imaging optical system; and a control amount obtaining means for obtaining a focus control amount corresponding to the value of the sharpness parameter obtained by the parameter obtaining means based on the correlation information stored in the storage section.

3. The focus control amount determination apparatus according to claim 1, wherein:

the apparatus further comprises a selection means for selecting a model from a plurality of models, each representing the predetermined structure with respect to each attribute; and the parameter obtaining means is a means for obtaining the sharpness parameter by applying the structure to the selected model.

4. The focus control amount determination apparatus according to claim 1, wherein the predetermined structure is a human face.

5. The focus control amount determination apparatus according to claim 1, wherein the model and the application to the model are realized by a method employing Active Appearance Models.

6. An imaging apparatus comprising:

an imaging optical system;

an image sensor forming an imaging surface on which an image of a subject is focused through the imaging optical system;

a conversion means for performing digital conversion on the image of the subject generated on the imaging surface;

the focus control amount determination apparatus according to claim 1; and a means for controlling the focus of the imaging optical system according to the control amount determined by the focus control amount determination apparatus.

7. The imaging apparatus according to claim 6, wherein the control amount determination means comprises:

a storage section for storing information indicating the correlation between the values of the sharpness parameter and focus control amounts of the imaging optical system; and a control amount obtaining means for obtaining a focus control amount corresponding to the value of the sharpness parameter obtained by the parameter obtaining means based on the correlation information stored in the storage section.

8. The imaging apparatus according to claim 6, wherein:

the apparatus further comprises a selection means for selecting a model from a plurality of models, each representing the predetermined structure with respect to each attribute; and the parameter obtaining means is a means for obtaining the sharpness parameter by applying the structure to the selected model.

9. The imaging apparatus according to claim 6, wherein the predetermined structure is a human face.

10. The imaging apparatus according to claim 6, wherein the model and the application to the model are realized by a method employing Active Appearance Models.

11. A focus control amount determination method comprising the steps of:

detecting a predetermined structure within a subject from inputted image data obtained through digital conversion of an image of the subject generated on an imaging surface, formed of an image sensor, by focusing light from the subject through an imaging optical system;

obtaining a sharpness parameter that represents a weighting value for a statistical characteristic amount representing a sharpness level of the structure by applying the detected structure to a model, which represents the structure by means of: one or more statistical characteristic amounts, including the statistical characteristic amount representing the sharpness level of the structure, obtained by performing a predetermined statistical processing on image data representing a plurality of images that represent the predetermined structure in different sharpness levels; and a weighting parameter for weighting each of the statistical characteristic amounts according to each of the characteristics of the structure; and determining the focus control amount for the imaging optical system such that the structure within the subject of the image is brought into focus according to the obtained value of the sharpness parameter.

* * * * *